United States Patent
Tabet et al.

(10) Patent No.: US 10,595,319 B2
(45) Date of Patent: Mar. 17, 2020

(54) ASYMMETRIC BANDWIDTH SUPPORT AND DYNAMIC BANDWIDTH ADJUSTMENT

(71) Applicant: Apple Inc., Cupertino, CA (US)

(72) Inventors: Tarik Tabet, Los Gatos, CA (US); Haijing Hu, Beijing (CN); Dawei Zhang, Saratoga, CA (US); Yuchul Kim, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/571,577

(22) PCT Filed: Nov. 5, 2016

(86) PCT No.: PCT/CN2016/104799
§ 371 (c)(1),
(2) Date: Nov. 3, 2017

(87) PCT Pub. No.: WO2018/082078
PCT Pub. Date: May 11, 2018

(65) Prior Publication Data
US 2019/0132830 A1    May 2, 2019

(51) Int. Cl.
*H04W 72/04* (2009.01)
*H04W 72/08* (2009.01)
*H04W 72/12* (2009.01)

(52) U.S. Cl.
CPC ..... *H04W 72/048* (2013.01); *H04W 72/0413* (2013.01); *H04W 72/085* (2013.01); *H04W 72/1284* (2013.01); *H04W 72/0453* (2013.01)

(58) Field of Classification Search
CPC ........... H04W 72/048; H04W 72/0413; H04W 72/085; H04W 72/1284
See application file for complete search history.

(56) References Cited

U.S. PATENT DOCUMENTS 5,914,942 A * 6/1999 Hassan ............. H04B 7/18563
370/316
6,016,311 A    1/2000 Gilbert et al.
(Continued)

FOREIGN PATENT DOCUMENTS

EP    2 942 993 A1    11/2015
JP    A 2013-085282    5/2013
(Continued)

OTHER PUBLICATIONS

Office Action, Japanese Patent Application No. 2017-556719, dated Dec. 7, 2018, four pages.
(Continued)

*Primary Examiner* — Dung B Huynh
(74) *Attorney, Agent, or Firm* — Kowert Hood Munyon Rankin and Goetzel PC; Jeffrey C. Hood

(57) ABSTRACT

This disclosure relates to techniques for supporting asymmetric uplink and downlink bandwidth allocations for a wireless device, and for dynamically modifying the bandwidth allocations for a wireless device, in a wireless communication system. A cellular communication link may be established between a base station and a wireless device. The base station may determine an uplink bandwidth allocation and a downlink bandwidth allocation for the wireless device. The uplink bandwidth allocation and the downlink bandwidth allocation may be selected based on different criteria and may include different amounts of bandwidth. Indications of the uplink bandwidth allocation and the downlink bandwidth allocation may be provided to the wireless device. The base station and wireless device may communicate according to the uplink bandwidth allocation and the downlink bandwidth allocation.

20 Claims, 4 Drawing Sheets

| UE DL Category | UE UL Category | UE Categories | Maximum UE Channel Bandwidth DL [PRB] | Maximum UE Channel Bandwidth UL [PRB] |
|---|---|---|---|---|
| DL Category M2 | UL Category M2 | N/A | 25 | 6 |
| DL Category M2 | UL Category M2 | N/A | 25 | 25 |

(56) References Cited

U.S. PATENT DOCUMENTS

| | | | |
|---|---|---|---|
| 6,570,535 B1* | 5/2003 | Stevens | H01Q 3/2605 342/354 |
| 8,064,409 B1* | 11/2011 | Gardner | H04B 1/707 370/335 |
| 8,675,570 B2 | 3/2014 | Cai | |
| 8,675,583 B2* | 3/2014 | Lee | H04L 5/001 370/329 |
| 8,902,764 B2* | 12/2014 | Imai | H04B 7/2615 370/252 |
| 9,345,021 B2 | 5/2016 | Nory et al. | |
| 9,648,600 B2 | 5/2017 | Stanwood et al. | |
| 2002/0080816 A1* | 6/2002 | Spinar | H04W 28/20 370/449 |
| 2002/0119783 A1* | 8/2002 | Bourlas | H04W 72/1252 455/453 |
| 2006/0063533 A1* | 3/2006 | Matoba | H04L 5/0005 455/452.2 |
| 2006/0063543 A1* | 3/2006 | Matoba | H04L 1/0003 455/509 |
| 2006/0094366 A1* | 5/2006 | Cho | H04W 72/1278 455/67.11 |
| 2006/0245352 A1* | 11/2006 | Kang | H04L 1/0002 370/229 |
| 2007/0110004 A1* | 5/2007 | Liu | H04W 72/0486 370/335 |
| 2007/0115880 A1* | 5/2007 | Huh | H04W 72/10 370/329 |
| 2007/0230414 A1* | 10/2007 | Afrashteh | H04B 7/2621 370/338 |
| 2007/0237252 A1* | 10/2007 | Li | G06F 7/5446 375/264 |
| 2007/0291693 A1* | 12/2007 | Schultz | H04W 28/18 370/331 |
| 2007/0297386 A1* | 12/2007 | Zhang | H04L 5/06 370/344 |
| 2008/0037464 A1 | 2/2008 | Lim | |
| 2008/0081628 A1* | 4/2008 | Ye | H04W 72/1284 455/445 |
| 2008/0130486 A1* | 6/2008 | Lim | H04L 5/0007 370/210 |
| 2008/0259857 A1* | 10/2008 | Zheng | H04B 7/155 370/329 |
| 2009/0116435 A1* | 5/2009 | Koorapaty | H04L 5/0007 370/329 |
| 2009/0170514 A1* | 7/2009 | Yokoyama | H04W 72/085 455/436 |
| 2009/0196192 A1* | 8/2009 | Lim | H04W 52/247 370/252 |
| 2009/0279701 A1* | 11/2009 | Moisand | H04L 12/185 380/270 |
| 2010/0035625 A1* | 2/2010 | Damnjanovic | H04W 72/00 455/450 |
| 2010/0035653 A1* | 2/2010 | Chang | H04W 52/346 455/561 |
| 2010/0091727 A1* | 4/2010 | Ishii | H04W 72/04 370/329 |
| 2010/0128689 A1* | 5/2010 | Yoon | H04W 72/1231 370/329 |
| 2010/0177730 A1* | 7/2010 | Okuda | H04W 72/085 370/329 |
| 2010/0240379 A1* | 9/2010 | Kishiyama | H04B 1/7143 455/450 |
| 2010/0315962 A1* | 12/2010 | Imai | H04B 7/2615 370/252 |
| 2011/0002282 A1* | 1/2011 | Inoue | H04L 5/0007 370/329 |
| 2011/0014938 A1* | 1/2011 | Shekalim | H04L 5/0037 455/509 |
| 2011/0134887 A1* | 6/2011 | Jeon | H04W 36/0077 370/331 |
| 2011/0205993 A1* | 8/2011 | Cho | H04W 72/1236 370/329 |
| 2011/0256897 A1* | 10/2011 | Taoka | H04B 7/0615 455/509 |
| 2011/0275395 A1* | 11/2011 | Norlund | H04W 52/0216 455/509 |
| 2012/0003941 A1* | 1/2012 | Xiao | H04W 52/0229 455/68 |
| 2012/0063373 A1* | 3/2012 | Chincholi | H04L 5/001 370/281 |
| 2012/0094681 A1* | 4/2012 | Freda | H04W 72/02 455/452.1 |
| 2012/0115518 A1* | 5/2012 | Zeira | H04W 8/005 455/500 |
| 2012/0182952 A1* | 7/2012 | Stanwood | H04B 7/2615 370/329 |
| 2012/0190395 A1* | 7/2012 | Pan | H04L 5/001 455/509 |
| 2012/0213072 A1* | 8/2012 | Kotecha | H04W 28/0268 370/235 |
| 2012/0243453 A1* | 9/2012 | Hakola | H04L 5/003 370/311 |
| 2012/0275355 A1* | 11/2012 | Park | H04W 72/042 370/281 |
| 2012/0294203 A1* | 11/2012 | Koorapaty | H04L 1/0002 370/280 |
| 2013/0003680 A1* | 1/2013 | Yamamoto | G01S 5/0205 370/329 |
| 2013/0107819 A1* | 5/2013 | Noh | H04L 5/0094 370/329 |
| 2013/0121268 A1 | 5/2013 | Li | |
| 2013/0176854 A1* | 7/2013 | Chisu | H04W 80/06 370/241 |
| 2013/0208615 A1 | 8/2013 | Ishikura et al. | |
| 2013/0250766 A1* | 9/2013 | Chaudhuri | H04W 72/1242 370/235 |
| 2013/0265982 A1* | 10/2013 | Fwu | H04B 7/0639 370/329 |
| 2013/0286992 A1* | 10/2013 | Hong | H04W 72/0406 370/329 |
| 2013/0308572 A1* | 11/2013 | Sayana | H04W 72/048 370/329 |
| 2013/0322363 A1* | 12/2013 | Chen | H04W 72/042 370/329 |
| 2013/0324172 A1* | 12/2013 | Ahn | H04W 36/0094 455/501 |
| 2014/0036743 A1 | 2/2014 | Olfat | |
| 2014/0211737 A1* | 7/2014 | Takeda | H04W 52/146 370/329 |
| 2014/0241261 A1* | 8/2014 | Ratasuk | H04W 72/0453 370/329 |
| 2014/0313908 A1* | 10/2014 | da Silva | H04W 4/70 370/252 |
| 2015/0003395 A1 | 1/2015 | So | |
| 2015/0016350 A1* | 1/2015 | Moulsley | H04W 72/0453 370/329 |
| 2015/0063259 A1* | 3/2015 | Gohari | H04W 28/20 370/329 |
| 2015/0092694 A1* | 4/2015 | You | H04W 4/70 370/329 |
| 2015/0156002 A1* | 6/2015 | Huang | H04W 72/0446 370/280 |
| 2015/0326378 A1 | 11/2015 | Zhang et al. | |
| 2015/0349856 A1* | 12/2015 | Bengtsson | H04B 7/0413 370/252 |
| 2016/0044705 A1* | 2/2016 | Gao | H04W 72/1236 370/330 |
| 2016/0100395 A1* | 4/2016 | Xu | H04L 1/1607 370/336 |
| 2016/0249327 A1* | 8/2016 | Chen | H04W 4/70 |
| 2017/0070994 A1* | 3/2017 | Rico Alvarino | H04W 4/70 |
| 2017/0171771 A1* | 6/2017 | Jung | H04W 24/10 |
| 2017/0180040 A1* | 6/2017 | Wang | H04B 7/2643 |
| 2017/0196016 A1 | 7/2017 | Tabet et al. | |
| 2017/0215057 A1* | 7/2017 | Oga | H04L 27/26 |
| 2017/0289907 A1* | 10/2017 | Ang | H04W 52/0216 |
| 2017/0303263 A1* | 10/2017 | Islam | H04B 7/0408 |
| 2018/0020378 A1* | 1/2018 | Tsuboi | H04W 28/18 |

(56) References Cited

U.S. PATENT DOCUMENTS

| | | | |
|---|---|---|---|
| 2018/0020445 A1* | 1/2018 | Harada | H04J 1/00 |
| 2018/0042037 A1* | 2/2018 | Jin | H04W 72/121 |
| 2018/0049176 A1* | 2/2018 | Park | H04L 5/0053 |
| 2018/0049219 A1* | 2/2018 | Gupta | H04W 76/14 |
| 2018/0049227 A1* | 2/2018 | Moon | H04W 72/0446 |
| 2018/0062823 A1* | 3/2018 | Hasegawa | H04B 7/2621 |
| 2018/0063818 A1* | 3/2018 | Chen | H04W 24/02 |
| 2018/0077708 A1* | 3/2018 | Lepp | H04W 72/0413 |
| 2018/0235003 A1* | 8/2018 | Wong | H04W 72/042 |
| 2018/0295020 A1* | 10/2018 | Mo | H04W 16/14 |
| 2018/0367185 A1* | 12/2018 | Yi | H04B 1/7143 |
| 2019/0014561 A1* | 1/2019 | Takeda | H04J 11/00 |
| 2019/0045419 A1* | 2/2019 | Shrestha | H04W 36/0072 |
| 2019/0132830 A1* | 5/2019 | Tabet | H04W 72/048 |

FOREIGN PATENT DOCUMENTS

| | | |
|---|---|---|
| JP | A 2015-065604 | 4/2015 |
| WO | WO 1998/018213 | 4/1998 |
| WO | WO 2008/056425 A1 | 5/2008 |
| WO | WO 2015/013189 | 1/2015 |
| WO | WO 2016/010217 | 1/2016 |

OTHER PUBLICATIONS

Extended European Search Report, European Patent Application No. 16899693.2, dated Jan. 28, 2019, 2018, four pages.

NTT Docomo et al; "Non-synchronized Random Access Procedure for E-UTRA Uplink"; 3GPP Draft; RI-061660; 3rd Generation Partnership Project (3GPP), Mobile Competence Centre; 650, Route Des Lucioles; F-06921, Sophia-Antipolis Cedex, France; vol. RAN WG1, no. Cannes, France; Jun. 20, 2006; XP050111492; six pages.

Notification of Transmittal of International Preliminary Report on Patentability, PCT No. PCT/CN2016/104799, dated Mar. 11, 2019, five pages.

Office Action, Patent Application No. 10-2017-7031712, dated May 7, 2019, four pages.

Office Action, Japanese Patent Application No. 2017-556719 , dated Apr. 9, 2019, three pages.

Huawei, Hisilicon; "On supporting larger maximum TBS and wider bandwidth for FeMTC"; 3GPP TSG-RAN WG2 Meeting #95bis; R2-166417; Oct. 10-14, 2016 ; five pages.

Samsung; "[Draft CR] SI update on the dedicated signalling in Rel-13 eMTC"; 3GPP TSG-RAN WG2 Meeting #94; R2-163455; May 23-27, 2016; eight pages.

* cited by examiner

| UE DL Category | UE UL Category | UE Categories | Maximum UE Channel Bandwidth DL [PRB] | Maximum UE Channel Bandwidth UL [PRB] |
|---|---|---|---|---|
| DL Category M2 | UL Category M2 | N/A | 25 | 6 |
| DL Category M2 | UL Category M2 | N/A | 25 | 25 |

FIG. 6

ASYMMETRIC BANDWIDTH SUPPORT AND DYNAMIC BANDWIDTH ADJUSTMENT

TECHNICAL FIELD

The present application relates to wireless communication, including to techniques for supporting asymmetric uplink and downlink bandwidth in a wireless communication system.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". Many such devices have relatively limited wireless communications capabilities and typically have smaller batteries than larger portable devices, such as smart phones and tablets. In general, it would be desirable to recognize and provide support for the relatively limited wireless communication capabilities of such devices. Therefore, improvements in the field are desired.

SUMMARY

Embodiments are presented herein of, inter alia, systems, apparatuses, and methods for supporting dynamically adjustable and potentially asymmetric bandwidth for uplink and downlink communication in a wireless communication system.

The communication needs of a wireless device may, at least in some instances, vary over time. For example, at certain times a wireless device might communicate minimal if any data, while at other times the wireless device might communicate large amounts of data. Additionally, at least in some instances, the balance of uplink and downlink communication by a wireless device may be relatively equal at some times, and may differ substantially at other times.

In view of such variable communication characteristics, wireless devices and cellular networks generally may benefit from supporting flexible and potentially asymmetric uplink and downlink bandwidth allocations. This disclosure presents various techniques for a cellular base station and wireless device to communicate in a manner that supports such dynamically adjustable and potentially asymmetric uplink and bandwidth allocations.

Such techniques may benefit wireless devices, at least according to some embodiments, by allowing them to configure their radio components for relatively wide- or narrow-band communication, as appropriate to the current uplink and band downlink bandwidth allocations provided by their serving cells, and thereby to operate in a potentially more power-efficient manner. Such techniques may also or alternatively benefit cellular networks generally by allowing more efficient overall use of radio resources, as adjusting the bandwidth allocation downward for one device may generally free resources to adjust the bandwidth allocation upward for another device, and vice versa.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 6 is an exemplary portion of a table illustrating possible supported maximum uplink and downlink channel bandwidths for certain device categories, according to some embodiments.

Figure 1:
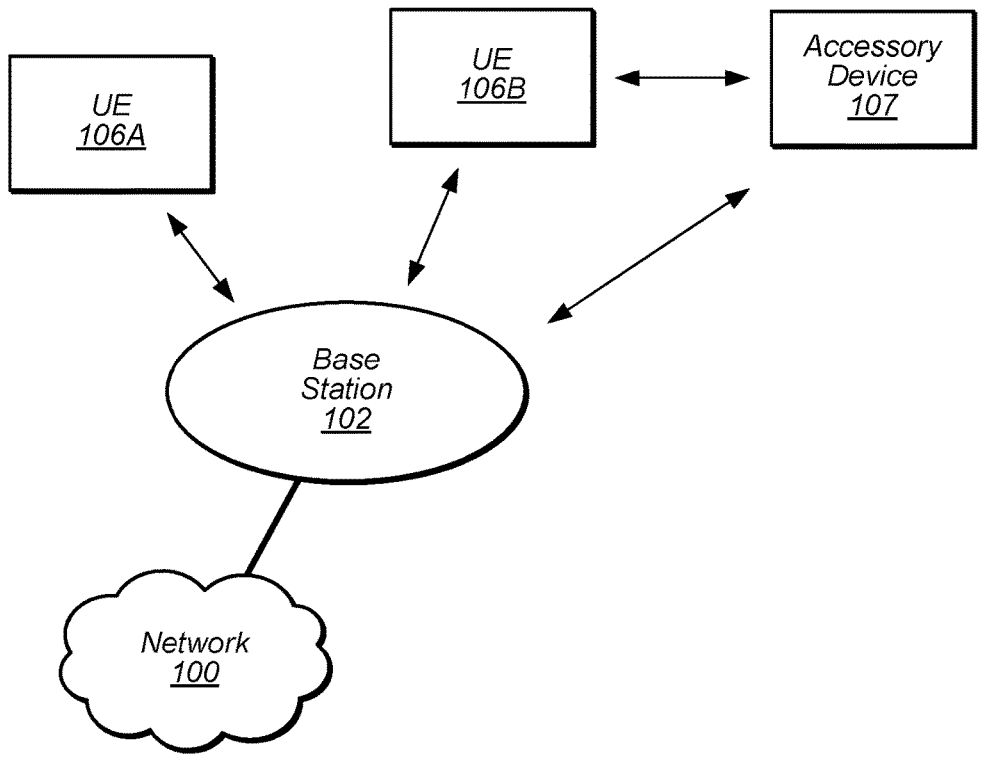
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
GSM: Global System for Mobile Communications
UMTS: Universal Mobile Telecommunications System
LTE: Long Term Evolution Terminology The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
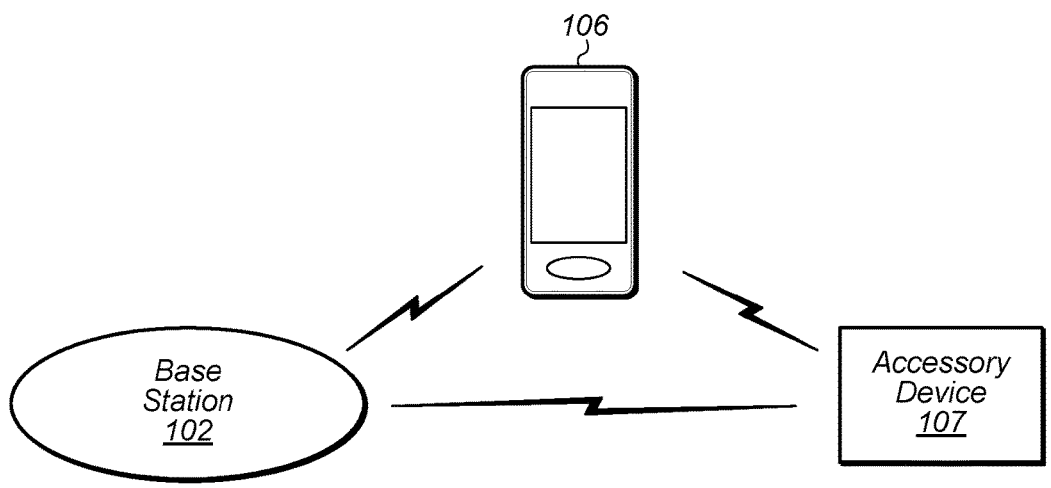
FIG. 2 illustrates an example system where an accessory device can selectively either directly communicate with a cellular base station or utilize the cellular capabilities of an intermediate or proxy device such as a smart phone, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1xRTT, 1xEV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B are typically handheld devices such as smart phones or tablets, but may be any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi.

The accessory device 107 includes cellular communication capability and hence is able to directly communicate with cellular base station 102. However, since the accessory device 107 is possibly one or more of communication, output power and/or battery limited, the accessory device 107 may in some instances selectively utilize the UE 106B as a proxy for communication purposes with the base station 102 and hence to the network 100. In other words, the accessory device 107 may selectively use the cellular communication capabilities of the UE 106B to conduct its cellular communications. The limitation on communication abilities of the accessory device 107 can be permanent, e.g., due to limitations in output power or the radio access technologies (RATs) supported, or temporary, e.g., due to conditions such as current battery status, inability to access a network, or poor reception.

FIG. 2 illustrates an example accessory device 107 in communication with base station 102. The accessory device 107 may be a wearable device such as a smart watch. The accessory device 107 may comprise cellular communication capability and be capable of directly communicating with the base station 102 as shown. When the accessory device 107 is configured to directly communicate with the base station, the accessory device may be said to be in "autonomous mode."

The accessory device 107 may also be capable of communicating with another device (e.g., UE 106), referred to as a proxy device or intermediate device, using a short range communications protocol; for example, the accessory device 107 may according to some embodiments be "paired" with the UE 106. Under some circumstances, the accessory device 107 may use the cellular functionality of this proxy device for communicating cellular voice/data with the base station 102. In other words, the accessory device 107 may provide voice/data packets intended for the base station 102 over the short range link to the UE 106, and the UE 106 may use its cellular functionality to transmit (or relay) this voice/data to the base station on behalf of the accessory device 107. Similarly, the voice/data packets transmitted by the base station and intended for the accessory device 107 may be received by the cellular functionality of the UE 106 and then may be relayed over the short range link to the accessory device. As noted above, the UE 106 may be a mobile phone, a tablet, or any other type of hand-held device, a media player, a computer, a laptop or virtually any type of wireless device. When the accessory device 107 is configured to indirectly communicate with the base station using the cellular functionality of an intermediate or proxy device, the accessory device may be said to be in "relay mode."

The UE 106 and/or 107 may include a device or integrated circuit for facilitating cellular communication, referred to as a cellular modem. The cellular modem may include one or more processors (processing elements) and various hardware components as described herein. The UE 106 and/or 107 may perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or 107 may include one or more antennas for communicating using two or more wireless communication protocols or radio access technologies. In some embodiments, the UE device 106/107 might be configured to communicate using a single shared radio. The shared radio may couple to a single antenna, or may couple to multiple antennas (e.g., for MIMO) for performing wireless communications. Alternatively, the UE device 106/107 may include two or more radios. Other configurations are also possible.

The accessory device 107 may be any of various types of devices that, in some embodiments, have a smaller form factor relative to a conventional smart phone, and may have one or more of limited communication capabilities, limited output power, or limited battery life relative to a conventional smart phone. As noted above, in some embodiments, the accessory device 107 is a smart watch or other type of wearable device. As another example, the accessory device 107 may be a tablet device, such as an iPad, with Wi-Fi capabilities (and possibly limited or no cellular communication capabilities), which is not currently near a Wi-Fi hotspot and hence is not currently able to communicate over Wi-Fi with the Internet. Thus, as defined above, the term "accessory device" refers to any of various types of devices that in some instances have limited or reduced communication capabilities and hence may selectively and opportunistically utilize the UE 106 as a proxy for communication purposes for one or more applications and/or RATs. When the UE 106 is capable of being used by the accessory device 107 as a proxy, the UE 106 may be referred to as a companion device to the accessory device 107.

Figure 3:
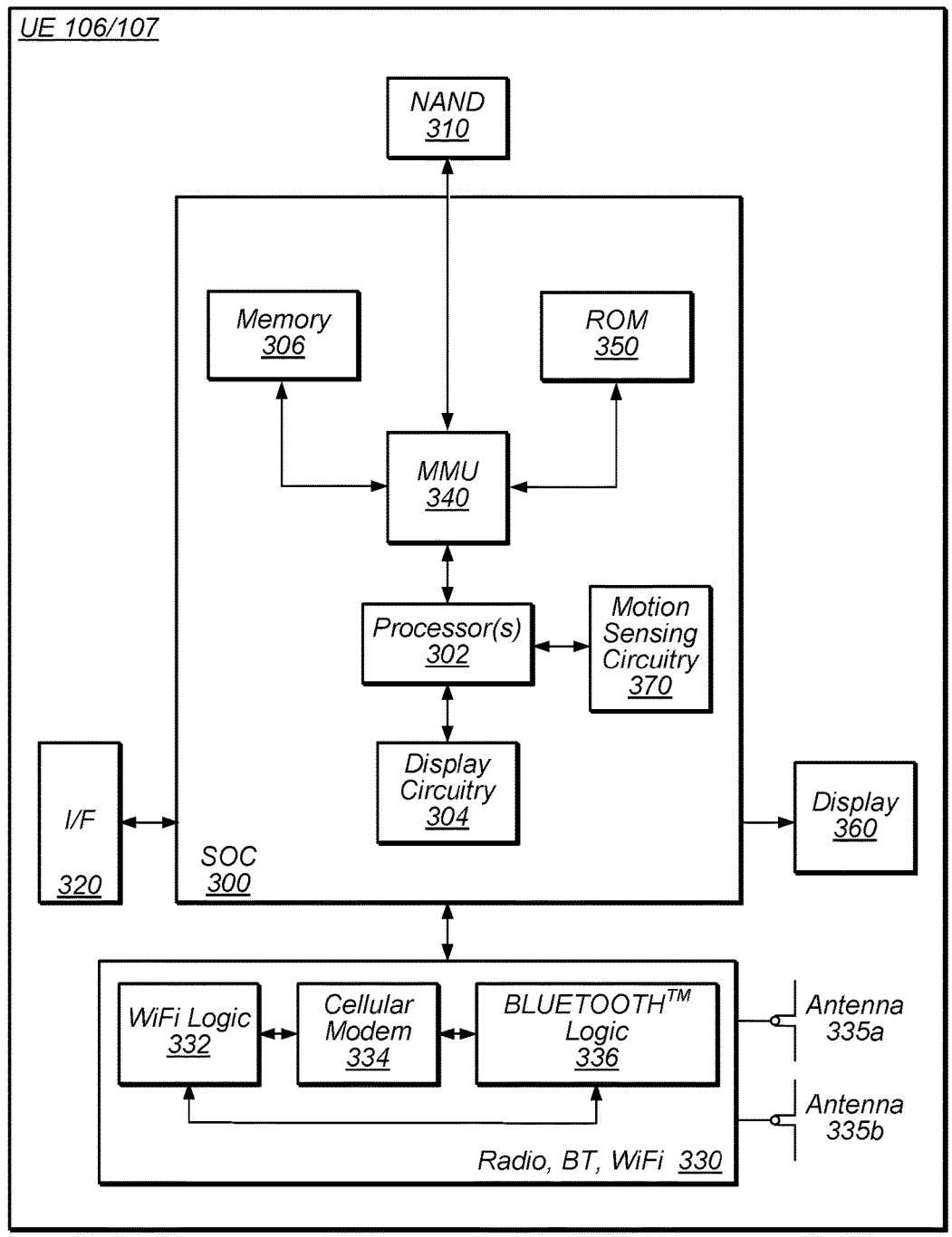
FIG. 3 is a block diagram illustrating an example wireless device, according to some embodiments.

FIG. 3—Block Diagram of a UE Device

FIG. 3 illustrates one possible block diagram of an UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, Bluetooth, Wi-Fi, NFC, GPS, etc.).

The UE device 106/107 may include at least one antenna, and in some embodiments multiple antennas 335*a* and 335*b*, for performing wireless communication with base stations and/or other devices. For example, the UE device 106/107 may use antennas 335*a* and 335*b* to perform the wireless communication. As noted above, the UE device 106/107 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. For example, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
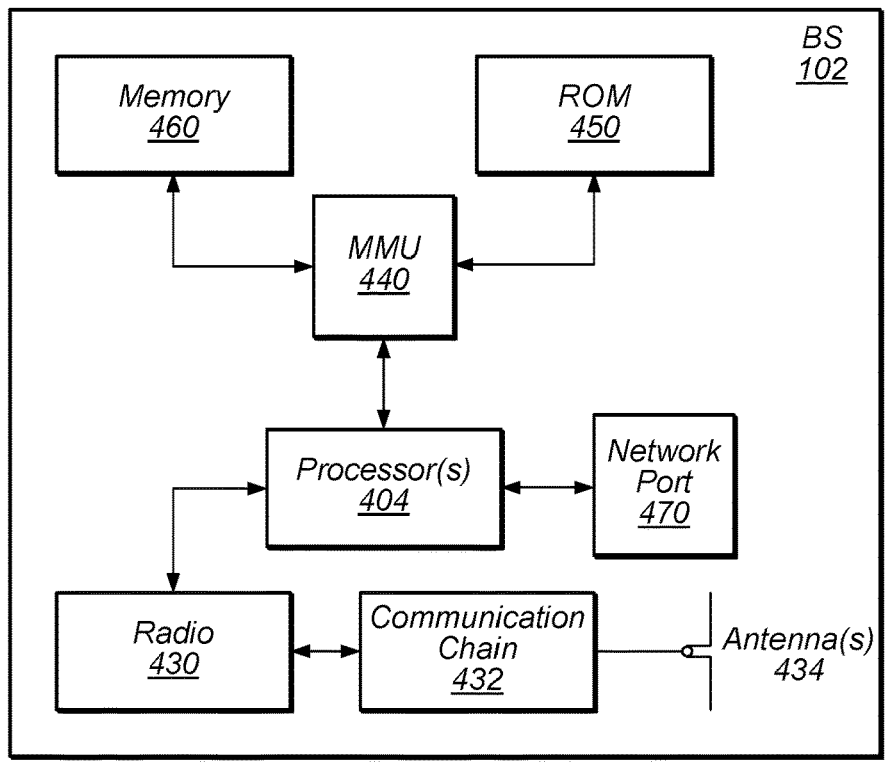
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and UMTS, LTE and CDMA2000, UMTS and GSM, etc.).

As described further subsequently herein, the BS 102 may include hardware and software components for implementing features described herein. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

Figure 5:
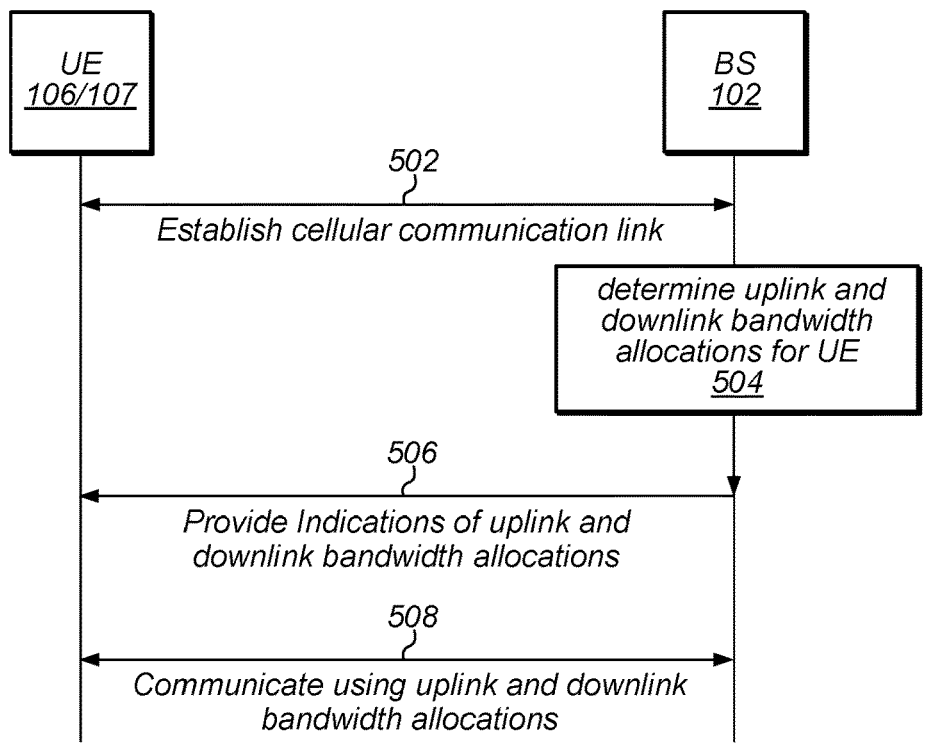
FIG. 5 is a communication flow diagram illustrating an exemplary method for dynamically selecting uplink and downlink bandwidth allocations for a wireless device with support for asymmetric uplink and downlink bandwidth allocations, according to some embodiments.

FIG. 5—Communication Flow Diagram

As cellular communication technologies evolve, an increasing number of cellular communication capable devices are expected to be deployed. One of the reasons for the continuing increase in the numbers of devices includes the development and spread of devices performing machine type communication (MTC). Such devices, which may include stationary deployed devices, wearable devices, and/or other devices forming part of the "Internet of Things", may commonly be designed to perform frequent and/or periodic small data transmissions.

In view of the potentially more limited expected usage scenarios for such devices, devices primarily expected to perform MTC may commonly be lower-complexity devices than many other common cellular devices (e.g., handheld cellular phones, etc.), for example to reduce the size, cost of manufacture, and/or cost to the consumer of such devices. Accordingly, in many instances the communication capability (e.g., number of tx/rx antennas, number of RF chains, transmission power, battery capability, communication range, tx/rx peak data rates, supported bandwidth etc.) of such devices may be relatively limited. For example, many such devices may be considered link budget limited devices.

This may present difficulties in a wireless communication system that primarily supports wireless devices with greater communication capability. Accordingly, at least some wireless communication technologies are being revised and/or developed in a manner to support link budget limited devices (e.g., in addition to those wireless devices that are not link budget limited).

As one possible consideration relating to link budget limited devices and more generally to wireless communication, in a communication system with variable bandwidth communication channels, such as LTE, there can be a substantial difference in a wireless device's power consumption when operating in a wideband communication mode (e.g., using a larger amount of bandwidth) versus when operating in a narrowband communication mode (e.g., using a smaller amount of bandwidth). Additionally, the communication needs of a wireless device with respect to uplink and downlink communication may not always be equal. Thus, at least in some instances, it may improve any or all of the power consumption profile of a wireless device, the total throughput of a wireless device, and/or the overall communication system resource usage efficiency to dynamically manage the communication bandwidth of wireless device and to support asymmetric bandwidth allocations for uplink and downlink communication.

Accordingly, FIG. 5 is a communication flow diagram illustrating a method for separately allocating and dynamically adjusting the uplink and downlink communication bandwidth of a wireless device, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 5 may be implemented by a wireless device, such as a UE 106 or 107 illustrated in and described with respect to FIGS. 1-3 and/or a base station 102 such as illustrated in and described with respect to FIGS. 1, 2, and 4, or more generally in conjunction with any of the computer systems or devices shown in the above Figures, among other devices, as desired. Note that while at least some elements of the method of FIG. 5 are described in a manner relating to the use of communication techniques and/or features associated with LTE and/or 3GPP specification documents, such description is not intended to be limiting to the disclosure, and aspects of the method of FIG. 5 may be used in any suitable wireless communication system, as desired. As shown, the method may operate as follows.

In 502, the wireless device and the base station may establish a cellular communication link. For example, the base station may provide a cell, and the wireless device may camp on the cell provided by the base station (e.g., the cell may be a serving cell for the wireless device). To camp on the serving cell, the wireless device may detect that the serving cell exists, obtain timing synchronization and decode system information for the serving cell, and attach to the cell (e.g., by performing an attachment procedure), according to some embodiments. As another possibility, the wireless device may have initially camped on a different serving cell, but may have attached to the cell provided by the base station as a result of a cell re-selection procedure or (e.g., network assisted) handover procedure. The wireless device may operate in an idle mode (e.g., while a radio resource control (RRC) connection is not established), and/or may operate in a connected mode (e.g., while a RRC connection is established), at various times while camping on the serving cell.

The communication link between the wireless device and the base station may provide the wireless device with a communicative link to a cellular network, such as a core network of a cellular service provider (e.g., with which a user of the wireless device may have a subscription and/or other agreement to provide cellular service). When operating in connected mode with the serving cell, the cellular network may thus provide connectivity between the user device and various services and/or devices coupled to the cellular network, such as other user devices, a public switched telephone network, the Internet, various cloud-based services, etc. A variety of possible data types, with different characteristics, may be transmitted via the serving cell. In addition, various signaling messages may be exchanged at various times to establish, maintain, reconfigure, and/or otherwise provide signaling functionality between the wireless device and the serving cell.

In 504, the base station may determine uplink and downlink bandwidth allocations for the wireless device. The uplink and downlink bandwidth allocations may be among the communication parameters of the cellular communication link. According to some embodiments, the uplink and downlink bandwidth allocations, respectively, may represent the maximum bandwidths within which the base station will allocate radio resources to the wireless device for uplink and downlink communication, respectively, e.g., at least until the uplink and/or downlink bandwidth allocations are updated by the base station. The uplink and downlink bandwidth allocations may be selected from a number of discrete bandwidth allocation options, or may be selected from a continuous range of possible uplink and downlink bandwidth allocations, among various possibilities. For example, as one possibility, an LTE cell might select bandwidth allocations for a wireless device among the various possible supported cell widths according to LTE up to the maximum bandwidth of the cell provided by the base station, e.g., among 1.4 MHz, 3 MHz, 5 MHz, 10 MHz, 15 MHz, and 20 MHz. In some embodiments, the choices may also or alternatively be limited by a maximum operating bandwidth of the wireless device, e.g., based on its device category; for example, some wireless devices may be limited to a maximum of 5 MHz communication bandwidth, according to some embodiments, in which case the bandwidth allocations might be selected from among 1.4 MHz, 3 MHz, or 5 MHz. Any number of other possible granularities of uplink and downlink bandwidth allocation choices, e.g., according to LTE or other wireless communication systems, are also possible.

Determining the uplink and downlink bandwidth allocations for the wireless device may be based on any of a variety of considerations. According to some embodiments, the uplink bandwidth allocation may be determined based on certain uplink bandwidth allocation selection criteria, while the downlink bandwidth allocation may be determined based on certain downlink bandwidth allocation selection criteria. The uplink bandwidth allocation selection criteria may differ from the downlink bandwidth allocation selection criteria, which may result in the uplink bandwidth allocation differing from the downlink bandwidth allocation. For example, the amount of bandwidth allocated according to the uplink bandwidth allocation may be a different amount of bandwidth than the amount of bandwidth allocated according to the downlink bandwidth allocation.

According to some embodiments, the uplink and downlink bandwidth allocation selection criteria may include and/or be based on any or all of a device category (e.g., UL category, DL category, overall category, etc.) of the wireless device, expected upcoming uplink traffic amounts and/or patterns for the wireless device, expected upcoming downlink traffic amounts and/or patterns for the wireless device, channel quality information for the cellular communication link (e.g., relating to either or both of an uplink communication channel or a downlink communication channel of the cellular communication link), among various possibilities.

Some of the criteria for either or both of uplink and downlink bandwidth allocation selection may be based at least in part on information received by the base station from the wireless device, according to some embodiments. For example, according to some embodiments, the wireless device may occasionally and/or periodically provide a buffer status report (e.g., that the wireless device may generate and transmit to the base station based on the amount of uplink data buffered by the wireless device) that indicates the expected amount of upcoming uplink traffic for the wireless device. As another example, the wireless device may occasionally and/or periodically perform cell measurements (e.g., serving cell measurements, neighboring cell measurements, etc.) and provide the results of those measurements (e.g., directly or as channel quality information generated based on those measurements, among various possibilities) to the base station.

Additionally or alternatively, some of the criteria for either or both of uplink and downlink bandwidth allocation selection may be based at least in part on information generated and/or stored by the base station, according to some embodiments. For example, the base station may monitor the amount of downlink data buffered for the wireless device as an indication of the expected amount of upcoming downlink traffic for the wireless device. As another example, the base station may occasionally and/or periodically perform measurements regarding the channel quality of the communication link between the wireless device and the base station (e.g., using uplink sounding reference signals (SRS) and/or any of a variety of other possible techniques), and may determine the channel quality of the communication link based at least in part on those measurements.

As one possibility, downlink bandwidth selection may be based on a combination of the device category of the wireless device (e.g., with respect to downlink communications and/or in general, depending on the granularity of device categorization available), the expected amount of upcoming downlink traffic, and the channel quality of the cellular communication link (e.g., at least for downlink communications).

As another possibility, the uplink bandwidth selection may be based on a combination of the device category of the wireless device (e.g., with respect to uplink communications and/or in general, depending on the granularity of device categorization available), the expected amount of upcoming uplink traffic, and the channel quality of the cellular communication link (e.g., at least for uplink communications).

Note that in some instances, some low complexity devices (e.g., LTE Rel-13 MTC devices, which may be referred to as category M1, and/or LTE Rel-14 MTC devices, which may be referred to as category M2, M3, or another (e.g., as-yet-undetermined) label), which may be uplink transmit power constrained (e.g., due to design choices and/or regulations, among various reasons), may be capable of power saving and/or greater throughput when performing relatively narrowband uplink communications in some scenarios, while being capable of greater throughput when performing relatively wideband uplink communications in other scenarios. For example, in cell edge or otherwise link budget challenged scenarios, such devices might not benefit from a larger uplink bandwidth, as the signal conditions in conjunctions with total uplink transmit power limitations may result in similar or lower net throughput than if using a narrower bandwidth in which the uplink transmit power can be concentrated. In contrast, in good signal conditions, such devices might be able to obtain greater throughput using a larger uplink bandwidth (e.g., corresponding to a greater number of radio resources), e.g., since the total uplink transmit power limitations may not substantially impact the ability of the base station to successfully decode the uplink transmissions in good signal conditions. Note, however, that if there is relatively little uplink data to be transmitted, it may be beneficial for a wireless device to operate in a narrower uplink bandwidth even in good signal conditions, e.g., as such operation may reduce the power consumption by the wireless device and allow a greater proportion of radio resources to be allocated by the base station to other devices (e.g., to provide more resources to devices with greater uplink traffic needs and/or to provide resources to a greater number of devices).

Thus, as one possible example, according to one set of embodiments, for a given ("first") device type, the uplink bandwidth allocation may be selected from a "narrowband" uplink bandwidth allocation or a "wideband" uplink bandwidth allocation. The wideband bandwidth allocation may be selected if an expected upcoming uplink data volume from the wireless device is above a data volume threshold and if the cellular communication link is currently experiencing good signal conditions. The narrowband bandwidth allocation may alternatively be selected if an expected upcoming uplink data volume from the wireless device is below the data volume threshold or if the cellular communication link is not currently experiencing good signal conditions. Note that this example is provided for illustrative purposes and is not intended to be limiting; any number of other uplink and downlink bandwidth allocation selection algorithms, potentially including variations and/or alternatives to this example with respect to the number of possible bandwidth allocation choices, the conditions under which any possible bandwidth allocation choice is selected, and/or any of various other aspects, are also possible.

As noted above, the uplink bandwidth allocation for the wireless device and the downlink bandwidth allocation for the wireless device may include different amounts of bandwidth. For example, the downlink bandwidth allocation may be larger than the uplink bandwidth allocation, or vice versa. It may also be possible that the uplink bandwidth allocation and the downlink bandwidth allocation include the same amount of bandwidth, according to some embodiments.

In 506, the base station may provide indications of the uplink and downlink bandwidth allocations to the wireless device. The indications may be provided in any of a variety of ways, potentially including but not limited to a radio resource control (RRC) information element (IE) or a media access control (MAC) control element (CE). For example, as one possibility, the base station may provide indications of the uplink bandwidth allocation and the downlink bandwidth allocation by transmitting a RRCConnnectionreconfiguration message to the wireless device, which may include a field specified for indicating the uplink bandwidth allocation and another field specified for indicating the downlink bandwidth allocation.

In 508, the base station and the wireless device may communicate using the uplink and downlink bandwidth allocations. As previously noted, the uplink and downlink bandwidth allocations may represent maximum the uplink and downlink bandwidth with which the base station and the wireless device may communicate, at least according to some embodiments. Thus, according to some embodiments, the base station may allocate radio resources corresponding to smaller amounts of bandwidth than the allocated uplink and downlink bandwidths in certain radio frames and/or subframes within a radio frame, but may not allocate radio resources corresponding to larger amounts of bandwidth than the allocated uplink and downlink bandwidths at any given time.

For example, the base station may provide downlink data to the wireless device such that a portion of the transmission by the base station intended for the wireless device encompasses at most the allocated downlink bandwidth, and may receive uplink data from the wireless device on a bandwidth that is at most the allocated uplink bandwidth. In other words, the actual bandwidth portions used from the allocated bandwidth may be less than the allocated downlink bandwidth and/or uplink bandwidth (e.g., depending on resource assignment variations from radio frame to radio frame and/or potentially from subframe to subframe within a radio frame), at least according to some embodiments.

Either or both of the uplink and downlink bandwidth allocations may be dynamically adjusted by the base station. For example, according to some embodiments, the base station may determine, e.g., at a time subsequent to initially providing the uplink and downlink bandwidth allocations to the wireless device, to modify one or both of the uplink bandwidth allocation or the downlink bandwidth allocation for the wireless device. The base station may determine to modify the uplink and/or downlink bandwidth allocation for the wireless device based on changing conditions, as one possibility. For example, as one possibility, the base station might determine to modify the uplink bandwidth allocation for the wireless device based on receiving a buffer status report indicating an expected upcoming uplink data volume that is below a data volume threshold when a buffer status report on which the previous uplink bandwidth allocation was at least partially based indicated an expected upcoming uplink data volume that is above the data volume threshold, or vice versa. As another possibility, the base station might determine to modify the uplink bandwidth allocation for the wireless device based on determining that signal conditions for the wireless device have changed (e.g., channel conditions have crossed a channel condition threshold relative to the channel conditions on which the previous uplink bandwidth allocation was at least partially based). In such an instance, the base station may provide an indication of the modified uplink bandwidth allocation and/or the modified downlink bandwidth allocation to the wireless device. The base station and the wireless device may then communicate using the modified bandwidth allocations.

Thus, the uplink and/or downlink bandwidth allocations for a wireless device may be considered semi-static, according to some embodiments. This may allow for the wireless device to configure its transceiver/radio components to the appropriate bandwidth for uplink and downlink communication for sufficient time periods to potentially benefit from narrowband operations, while retaining the flexibility to occasionally adjust the uplink and/or downlink bandwidth allocations based on radio conditions, traffic patterns, and/or other considerations. This may in turn allow for better performance and/or more efficient operation (e.g., potentially including reduced power consumption) by the wireless device, as well as more efficient overall system operation, at least according to some embodiments.

FIG. 6 and Additional Information

FIG. 6 and the following additional information are provided as being illustrative of further considerations and possible implementation details of the method of FIG. 5, and are not intended to be limiting to the disclosure as a whole. Numerous variations and alternatives to the details provided herein below are possible and should be considered within the scope of the disclosure.

In 3GPP Release 13 (Rel-13), enhancements for MTC (Machine-Type Communication) are introduced, including enhancements for low complexity MTC devices and coverage enhancements (CE) for MTC UEs. One technical area of the enhancements includes support of Bandwidth Reduced Low Complexity (BL) UEs. To support such UEs, a new Rel-13 low complexity UE category/type is introduced, i.e., category M1 for MTC operation in any LTE duplex mode (full duplex (FD) frequency division duplexing (FDD), half duplex (HD) FDD, time division duplexing (TDD)). Such UEs only need to support 1.4 MHz (6 physical resource blocs (PRBs)) RF bandwidth in downlink and uplink. Such bandwidth reduced UEs should be able to operate within any LTE system bandwidth. Another technical area of the enhancements includes support of UEs in Enhanced Coverage.

In 3GPP Release 14 (Rel-14), work on further enhancements for MTC (FeMTC) UE is ongoing, e.g., in order to achieve higher data rates for MTC UEs. One of the key aspects for higher data rates is to support larger physical downlink shared channel (PDSCH)/physical uplink shared channel (PUSCH) channel bandwidth.

For example, as one possibility, for Rel-14 BL UE CE mode A and CE mode B, the largest maximum UE channel bandwidth for PDSCH in RRC connected mode may be 5 MHz (25 PRBs). For Rel-14 BL UE CE mode A, the largest maximum UE channel bandwidth for PUSCH in RRC connected mode may be 5 MHz (25 PRBs). For Rel-14 non-BL UE CE mode A and CE mode B, the largest maximum UE channel bandwidth for PDSCH in RRC connected mode may be 5 or 20 MHz. For Rel-14 non-BL UE CE mode A, the largest maximum UE channel bandwidth for PUSCH in RRC connected mode may be 5 or 20 MHz. This wider bandwidth operation may be enabled by the base station (e.g., referred to as eNB in LTE contexts).

The MTC-Physical downlink control channel (MPDCCH) for Rel-14 may follow the Rel-13 design, which may imply that it can be decoded by a UE operating in narrowband operation (6 RB)

In current 3GPP protocols, transmission bandwidths for both DL and UL are identical, for both FDD and TDD. For example, 3GPP specification documents for RRC recite:
ul-Bandwidth
Parameter: Uplink bandwidth, see TS 36.101 [42, table 5.6-1]. For TDD, the parameter is absent and it is equal to downlink bandwidth. If absent for FDD, apply the same value as applies for the downlink bandwidth.

For Rel-14 FeMTC UEs, a maximum channel bandwidth of 5 HMz will be supported for PDSCH and PUSCH. However, in some scenarios (e.g., link budget challenged scenarios or cell edge scenarios), even if the maximum 5 MHz channel bandwidth is supported, FeMTC devices will not benefit from a larger bandwidth in the UL, whereas in the DL, a larger bandwidth translates to more power. Accordingly, an eNB scheduler might detect this scenario and allocate a smaller number of PRBs in such a scenario through an MPDCCH grant. However, it cannot be guaranteed, for example, that the number of PRBs will always be less than 6 PRBs in every sub-frame. This dynamic behavior will prevent the UE from operating in a power-efficient transceiver mode.

Note also that larger than needed/optimal bandwidth for FeMTC UE may also result in lower system capacity efficiency, as resources could be multiplexed between FeMTC devices and legacy UEs Example scenarios in which a narrower bandwidth for uplink than for downlink would be preferable could include: when buffered UL data in FeMTC devices is small, e.g., below a certain threshold; when UL radio conditions for a FeMTC device are poor or not stable; when a FeMTC device operates at cell edge; or any of various other link budget limited scenarios, according to various embodiments.

As noted above, typically in 3GPP systems, the system bandwidth is defined for both UL and DL. The UE needs to operate in the bandwidth signaled by the eNB. However, as an alternative, allowing asymmetric bandwidth allocation between UL and DL can help facilitate an efficient implementation of the UE transceiver that can potentially benefit its battery life and/or throughput, and can potentially improve overall system resource use efficiency, at least according to some embodiments.

As used herein, asymmetric bandwidth allocation between UL and DL may mean that DL bandwidth and UL bandwidth allocated to the UE can be different. The eNB may take any or all of the following factors, among other possible factors, into consideration for bandwidth allocation: UE category/capability (noting that asymmetric bandwidth allocation could also be used whether UE categories for DL and UL are the same or different); buffer status report (BSR) from UE; DL/UL traffic demand from higher layers; and/or measurements (e.g., as received from the UE and/or as measured directly by the eNB) that provide insight into the radio conditions experienced by the UE.

Such asymmetric bandwidth allocation to FeMTC devices can be semi-statically configured by eNB, e.g., via RRC signaling, as one possibility. The semi-static nature of the configuration may allow a better operation of the transceiver, e.g., that allows better performance and power consumption, at least according to some embodiments.

At least in some embodiments, the MPDCCH may follow the Rel-13 design, such that dynamic scheduling of PUSCH/PDSCH transmissions within the allocated bandwidth may remain possible. Note also that such asymmetric bandwidth allocation can apply to any or all of FDD UEs, HD-FDD UEs, or TDD UEs, among various possibilities.

Thus, if the UE knows in advance that the UL bandwidth is limited, it may be able to operate in a power optimized mode that may improve the battery life while potentially also mitigating thermal issues.

Any of various possible techniques may be used to signal UL and DL BS allocations to a UE. Some such techniques may involve one or more 3GPP protocol modifications to support such signaling. For example, as one possibility, a new or existing RRC information element (IE) could be defined or modified to have the potential to signal uplink and downlink bandwidth allocations separately. One such IE that could be modified to contain such information could include a RadioResourceConfigCommon IE, e.g., as currently defined in 3GPP 36.331. For example, a branch of the information element for PDSCH configuration in the RRC-Connectionreconfiguration message could be introduced in Rel-14, e.g., "DL-Bandwidth-r14" in "DL-Configuration-r14". Similarly, a branch of the information element for PUSCH configuration in the RRCConnectionreconfiguration message could be introduced in Rel-14, e.g., "UL-Bandwidth-r14" in "UL-Configuration-r14". As another possibility, the 3GPP specification documents may be modified to remove the restriction that DL and UL transmission bandwidth have the same value for both FDD and TDD.

As another possibility, 3GPP 36.306 may be modified to support flexible DL/UL category combinations and maximum UE channel bandwidths that can be set to different values for uplink and downlink, for example in accordance with the table portion illustrated in FIG. 6. As shown, in this example table portion, entries with the same maximum UE channel bandwidth for both downlink and uplink are possible, as are entries with different maximum UE channel bandwidths for downlink and uplink. Note that any number of additional entries, as well as variations and alternatives to the shown entries, are also possible, e.g., potentially with different maximum UE channel bandwidth DL and UL values for different UE UL and DL categories.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:
1. A base station, comprising:
an antenna;
a radio coupled to the antenna; and
a processing element coupled to the radio;
wherein the antenna, radio, and processing element are configured to:
provide a cell according to a cellular system bandwidth;
establish a cellular communication link with a wireless device on the cell;
determine a largest maximum physical uplink shared channel (PUSCH) bandwidth for the wireless device and a largest maximum physical downlink shared channel (PDSCH) bandwidth for the wireless device, wherein said determining is based on one or more of a device category of the wireless device or a coverage enhancement mode, wherein the respective largest maximum bandwidths are less than or equal to the cellular system bandwidth and greater than or equal to a narrowband bandwidth of 6 resource blocks;
receive information from the wireless device;
determine, based at least in part on the information, an uplink bandwidth allocation for the wireless device equal to or less than the largest maximum PUSCH bandwidth;
determine, based at least in part on the information, a downlink bandwidth allocation for the wireless device equal to or less than the largest maximum PDSCH bandwidth;
provide an indication in a RRCConnectionReconfiguration message of at least one of the uplink bandwidth allocation for PUSCH operation or the downlink bandwidth allocation for PDSCH operation to the wireless device causing the wireless device to operate in a mode according to the at least one of downlink bandwidth allocation for PDSCH operation or uplink bandwidth allocation for PUSCH operation;
dynamically schedule PDSCH and PUSCH communications associated with the wireless device on radio resources corresponding to amounts of bandwidth that are less than or equal to the downlink bandwidth allocation and the uplink bandwidth allocation, respectively;

indicate the radio resources for the PDSCH and PUSCH communications to the wireless device using a narrowband machine type communication (MTC)-Physical downlink control channel (MPDCCH), wherein the narrowband MPDCCH corresponds to a bandwidth of 6 resource blocks; and perform the scheduled PDSCH and PUSCH communications with the wireless device on the radio resources.

2. The base station of claim 1, wherein the antenna, radio, and processing element are further configured to:
receive a buffer status report from the wireless device, wherein determining the uplink bandwidth allocation is based at least in part on the buffer status report.

3. The base station of claim 1, wherein the antenna, radio, and processing element are further configured to:
receive channel quality information for the cellular communication link from the wireless device,
wherein determining the uplink bandwidth allocation is based at least in part on the channel quality information for the cellular communication link received from the wireless device.

4. The base station of claim 1, wherein the antenna, radio, and processing element are further configured to:
perform one or more channel quality measurements for the cellular communication link with the wireless device,
wherein determining the uplink bandwidth allocation is based at least in part on the one or more channel quality measurements for the cellular communication link with the wireless device.

5. The base station of claim 1,
wherein to determine the uplink bandwidth allocation, the antenna, radio, and processing element are further configured to select the uplink bandwidth allocation from at least a narrowband uplink bandwidth allocation and a wideband uplink bandwidth allocation,
wherein the wideband uplink bandwidth allocation is selected if an expected upcoming uplink data volume from the wireless device is above a data volume threshold and if the cellular communication link is currently experiencing conditions better than a channel condition threshold,
wherein the narrowband uplink bandwidth allocation is selected if the expected upcoming uplink data volume from the wireless device is below the data volume threshold or if the cellular communication link is not currently experiencing conditions better than the channel condition threshold.

6. The base station of claim 1,
wherein the uplink bandwidth allocation for the wireless device and the downlink bandwidth allocation for the wireless device comprise different amounts of bandwidth.

7. The base station of claim 1, wherein the antenna, radio, and processing element are further configured to:
determine to modify the uplink bandwidth allocation for the wireless device; and
provide an indication of the modified uplink bandwidth allocation to the wireless device.

8. The base station of claim 1, wherein the antenna, radio, and processing element are further configured to:
determine to modify the downlink bandwidth allocation for the wireless device;
provide an indication of the modified downlink bandwidth allocation to the wireless device.

9. The base station of claim 1, wherein at least one of the downlink bandwidth allocation or the uplink bandwidth allocation is semi-static.

10. An apparatus, comprising:
a processing element configured to cause a base station to:
provide a cell according to a cellular system bandwidth;
establish a cellular communication link with a wireless device on the cell;
determine a largest maximum physical uplink shared channel (PUSCH) bandwidth for the wireless device and a largest maximum physical downlink shared channel (PDSCH) bandwidth for the wireless device, wherein said determining is based on one or more of a device category of the wireless device or a coverage enhancement mode, wherein the respective largest maximum bandwidths are less than or equal to the cellular system bandwidth and greater than or equal to a narrowband bandwidth of 6 resource blocks;
receive information from the wireless device;
determine, based at least in part on the information, an uplink bandwidth allocation for the wireless device equal to or less than the largest maximum PUSCH bandwidth;
determine, based at least in part on the information, a downlink bandwidth allocation for the wireless device equal to or less than the largest maximum PDSCH bandwidth;
provide an indication in a RRCConnectionReconfiguration message of at least one of the uplink bandwidth allocation for PUSCH operation or the downlink bandwidth allocation for PDSCH operation to the wireless device causing the wireless device to operate in a mode according to the at least one of downlink bandwidth allocation for PDSCH operation or uplink bandwidth allocation for PUSCH operation;
dynamically schedule PDSCH and PUSCH communications associated with the wireless device on radio resources corresponding to amounts of bandwidth that are less than or equal to the downlink bandwidth allocation and the uplink bandwidth allocation, respectively;
indicate the radio resources for the PDSCH and PUSCH communications to the wireless device using a narrowband machine type communication (MTC)-Physical downlink control channel (MPDCCH), wherein the narrowband MPDCCH corresponds to a bandwidth of 6 resource blocks; and
perform the scheduled PDSCH and PUSCH communications with the wireless device on the radio resources.

11. The apparatus of claim 10,
wherein the uplink bandwidth allocation is selected based on one or more of:
an expected amount of upcoming uplink data from the wireless device;
a channel quality of a communication channel on which the cellular communication link is established.

12. The apparatus of claim 11,
wherein to determine the uplink bandwidth allocation for a first uplink device category, the processing element is further configured cause the base station to select the uplink bandwidth allocation from at least a narrowband uplink bandwidth allocation and a wideband uplink bandwidth allocation,
wherein the wideband uplink bandwidth allocation is selected if the expected amount of upcoming uplink data from the wireless device is above a data threshold and if the channel quality is above a channel quality threshold,
wherein the narrowband uplink bandwidth allocation is selected if the expected amount of upcoming uplink data from the wireless device is below the data threshold or if the channel quality is below the channel quality threshold.

13. The apparatus of claim 10,
wherein the downlink bandwidth allocation is selected based on one or more of:
an expected amount of upcoming downlink data for the wireless device;
a channel quality of a communication channel on which the cellular communication link is established.

14. The apparatus of claim 10,
wherein the cellular communication link is established according to a third generation partnership project (3GPP) cellular communication technology.

15. A wireless device, comprising:
an antenna;
a radio coupled to the antenna; and
a processing element coupled to the radio;
wherein the antenna, radio, and processing element are configured to:
establish a cellular communication link with a base station;
provide, to the base station, information;
receive, from the base station, an indication in a RRC-ConnectionReconfiguration message of at least one of an uplink bandwidth allocation for physical uplink shared channel (PUSCH) operation or a downlink bandwidth allocation for physical downlink shared channel (PDSCH) operation of the wireless device, wherein the uplink bandwidth allocation is equal to or less than a largest maximum PUSCH bandwidth and the downlink bandwidth allocation is equal to or less than a largest maximum PDSCH bandwidth;
receive, from the base station via a narrowband machine type communication (MTC)-Physical downlink control channel (MPDCCH) corresponding to a bandwidth of 6 resource blocks, dynamic scheduling information including an indication of radio resources for PDSCH and PUSCH communications, wherein the radio resources correspond to amounts of bandwidth that are less than or equal to the downlink bandwidth allocation and the uplink bandwidth allocation, respectively;
operate, in response to the indication of radio resources, in a mode according to the at least one of downlink bandwidth allocation for PDSCH operation or uplink bandwidth allocation for PUSCH operation; and
perform the scheduled PDSCH and PUSCH communications with the base station on the radio resources.

16. The wireless device of claim 15,
wherein the uplink bandwidth allocation comprises the largest maximum PUSCH bandwidth,
wherein the wireless device is configured to operate the radio in a narrowband uplink mode or a wideband uplink mode based on the uplink bandwidth allocation,
wherein the downlink bandwidth allocation comprises the largest maximum PDSCH bandwidth,
wherein the wireless device is configured to operate the radio in a narrowband downlink mode or a wideband downlink mode based on the downlink bandwidth allocation.

17. The wireless device of claim 15, wherein the antenna, radio, and processing element are further configured to:
receive an indication of a modified uplink bandwidth allocation; and
communicate with the base station according to the modified uplink bandwidth allocation.

18. The wireless device of claim 15, wherein the antenna, radio, and processing element are further configured to:
receive an indication of a modified downlink bandwidth allocation; and
communicate with the base station according to the modified downlink bandwidth allocation.

19. The wireless device of claim 15, wherein the antenna, radio, and processing element are further configured to:
perform one or more channel quality measurements for the cellular communication link with the base station; and
provide channel quality information for the cellular communication link to the base station,
wherein one or more of the uplink bandwidth allocation or the downlink bandwidth allocation are based at least in part on the channel quality information.

20. The wireless device of claim 15, wherein the antenna, radio, and processing element are further configured to:
determine an amount of uplink data buffered by the wireless device; and
provide a buffer status report to the base station, wherein the buffer status report provides an indication of the amount of uplink data buffered by the wireless device, wherein the uplink bandwidth allocation is based at least in part on the buffer status report.

* * * * *